United States Patent [19]

Gooch, IV et al.

[11] Patent Number: 5,135,705
[45] Date of Patent: Aug. 4, 1992

[54] PLUG AND METHOD FOR PLUGGING A PENETRATION IN A PRESSURE VESSEL WALL

[75] Inventors: Henry H. Gooch, IV, Lynchburg; Fred L. Snow, Jr., Forest, both of Va.; Kenneth D. Verble, Wolf Lake, Ill.

[73] Assignee: B&W Nuclear Service Company, Lynchburg, Va.

[21] Appl. No.: 698,035

[22] Filed: May 10, 1991

[51] Int. Cl.⁵ .............................. G21C 13/06
[52] U.S. Cl. ................... 376/203; 376/204; 165/71; 138/89; 29/890.031; 29/402.07; 29/723; 228/60
[58] Field of Search ............... 376/203, 204, 205, 206; 220/307; 165/71; 228/60, 119; 138/89; 29/890.031, 402.07, 723

[56] References Cited

U.S. PATENT DOCUMENTS

| | | | |
|---|---|---|---|
| 3,488,829 | 1/1970 | Boniface | 29/474.3 |
| 3,934,787 | 1/1976 | Fels | 228/184 |
| 4,178,966 | 12/1979 | Savor et al. | 138/89 |
| 4,203,185 | 5/1980 | Beyer et al. | 29/157.3 |
| 4,237,937 | 12/1980 | Healy, Sr. | 138/97 |
| 4,255,840 | 3/1981 | Loch et al. | 29/157 R |
| 4,440,339 | 4/1984 | Tamai et al. | 228/119 |
| 4,615,477 | 10/1986 | Spada et al. | 228/119 |
| 4,811,759 | 3/1989 | Billoué | 138/89 |

OTHER PUBLICATIONS

Alden, John W. et al., *Products and Services to Improve PWR Steam Generator Maintenance*, pp. 5 & 6, 4 Apr. 1983.

Primary Examiner—Brooks H. Hunt
Assistant Examiner—Chrisman D. Carroll
Attorney, Agent, or Firm—Robert J. Edwards; D. Neil LaHaye

[57] ABSTRACT

A plug and method for plugging a penetration in a pressure vessel wall having a sleeve protruding through the penetration. The sleeve is cut at a point between the interior and exterior surfaces of the pressure vessel wall. The cut portion of the sleeve extending beyond the exterior surface of the pressure vessel wall is removed. A plug sized to fit within the penetration is inserted into the penetration so that one end of the plug is flush with the exterior surface of the pressure vessel wall. A weld pad is deposited on the end of the plug and the exterior surface of the pressure vessel wall.

2 Claims, 1 Drawing Sheet

PLUG AND METHOD FOR PLUGGING A PENETRATION IN A PRESSURE VESSEL WALL

BACKGROUND OF THE INVENTION

1. Field of the Invention

The present invention is generally related to the repair of pressure vessels and more particularly to plugging penetrations in pressure vessels.

2. General Background

The pressurizer in a nuclear reactor coolant system establishes and maintains the reactor coolant system pressure within the prescribed limits of the system. It provides a steam surge chamber and a water reserve to accommodate reactor coolant density changes during operation. A typical pressurizer is a vertical, cylindrical vessel with replaceable electric heaters in its lower section. The electric heaters are positioned below the normal water line and are actuated to restore normal operating pressure when the pressure in the reactor coolant system has decreased.

The electric heaters are comprised of a plurality of heating elements that extend through nozzles or sleeves through the wall of the pressurizer. The sleeves extend outward from the pressurizer to provide exterior support to the heating elements. The sleeves may be formed from an inconel sleeve roll expanded and welded into the pressurizer. Due to the severe operating environment, cracks have developed in the rolled/welded region of some sleeves. This results in leakage of primary system fluid which is unacceptable in a nuclear steam supply system. Although the ideal situation is to make a permanent repair by replacing the damaged sleeve, this option is not always readily available due to the cost of putting the system out of service for the time needed to make such repairs. This presents a need for an interim repair at minimum expense to the utility until the sleeve can be replaced at a more appropriate time such as during routine scheduled maintenance. Since pressurizer components in nuclear power plants become radioactive, after they have been in operation, it is preferable that any repairs can be made without the need for personnel to enter the pressurizer so as to minimize exposure. Repair apparatus and methods which applicants are aware of include the following.

U.S. Pat. No. 4,255,840 discloses a method of replacing an immersion heater in a pressurizer for a nuclear power plant.

U.S. Pat. No. 4,615,477 discloses a method for replacing tubes in a header or drum without entirely removing the old tube.

U.S. Pat. No. 4,440,339 discloses a method for repairing the housing of a control rod driving system of a nuclear reactor.

U.S. Pat. No. 4,203,185 discloses a method for sealing tube plate apertures in heat exchangers. This is directed to the formation of an insulating space over the major part of the thickness of the tube plate rather than to welding techniques.

U.S. Pat. No. 3,934,787 discloses a method for welding steel pipe to a pressure vessel. An opening is cut in the wall of the vessel and a connection member of lenticular shape having a thickened central portion is joined to the pipe and vessel.

U.S. Pat. No. 4,178,966 discloses a tube plug having a lip that limits the distance the plug can be inserted into the tube and supplies filler material at the weld zone between the plug and tube.

U S. Pat. No. 4,811,759 discloses a device for closing holes in a tubular plate of a steam generator. A sleeve receives a plug which is swaged and welded in position in the sleeve. The sleeve is fastened in the tube hole by expanding that portion of the sleeve in the tube plate.

Pending U.S. application assigned Ser. No. 07/468,448 and filed Jan. 22, 1990, now U.S. Pat. No. 5,094,801, on which one of the present applicants is a coinventor, discloses a replacement heater sleeve for a nuclear reactor coolant system pressurizer and method for replacing a damaged original heater nozzle.

The known art is directed mainly to the replacement of sleeve penetrations or the cutting of a new opening and welding of a pipe to the opening to create a new penetration. This leaves a need for a method and apparatus to close a penetration at minimum cost to the utility until a more appropriate time for permanent repair and replacement of the sleeve.

SUMMARY OF THE INVENTION

The present invention solves the above need in a straightforward manner. What is provided is a plug and method for plugging a penetration in a pressure vessel that eliminates the problems of previously used methods. The existing sleeve in the penetration is cut at a point between the exterior and interior walls of the pressurizer. The cut portion of the sleeve extending beyond the exterior wall is then removed. A plug is inserted into the penetration such that the plug is flush with the exterior wall of the pressurizer. A weld deposited pad that covers the edges of the plug is then added to the exterior wall of the pressurizer.

BRIEF DESCRIPTION OF THE DRAWINGS

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
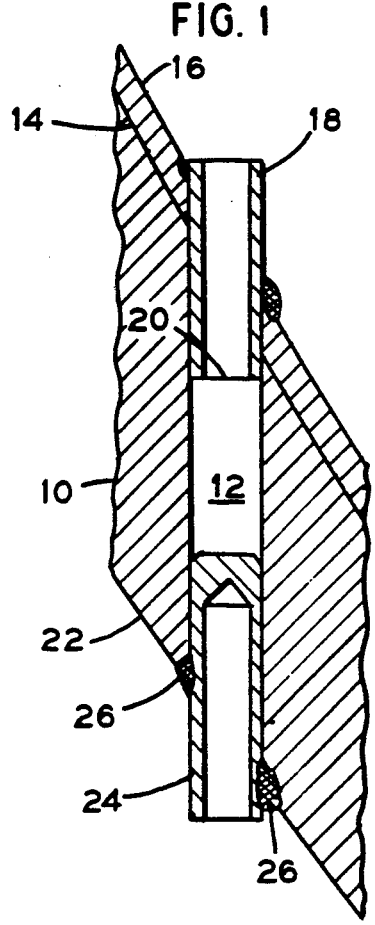
FIGS. 1 and 2 illustrate sectional views of prior art plugging methods.
Figure 2:
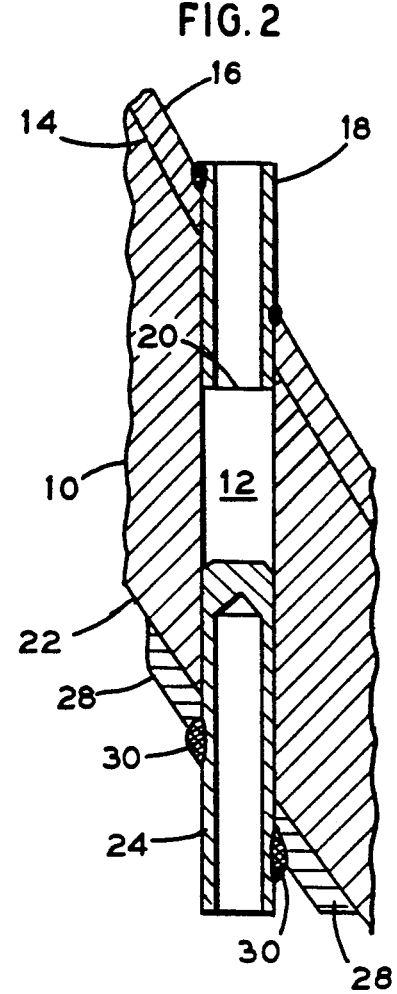

Referring to the drawings, FIGS. 1 and 2 illustrate previously used methods of plugging a penetration in a pressure vessel. For ease of illustration, only a small portion of pressure vessel wall 10 is shown. It should be understood that there are a number of penetrations 12 or bores through wall 10. Wall 10 is commonly formed from carbon steel or a low-alloy steel. For corrosion protection, interior surface 14 is provided with cladding 16 normally made from stainless steel. FIGS. 1 and 2 both show the end result of the respective plugging methods. In both methods, sleeve 18 has been cut at the point indicated by numeral 20. The portion of sleeve 18 extending below point 20 through wall 10 and out exterior surface 22 of wall 10 has been removed. In FIG. 1, plug 24 was then inserted into penetration 12 and partial penetration weld 26 was then made around plug 24 to hold it in place. In FIG. 2, weld deposited pad 28 was then made around penetration 12. Penetration 12 and weld deposited pad 28 were then required to be machined before plug 24 could be inserted due to the welding process causing wall 10 to be heated up to 400-500 degrees F. Plug 24 was then inserted and partial penetration weld 30 made to hold it in place. Pad 28 is normally used when additional reinforcement is required. In both methods, the partial penetration weld and weld deposited pad respectively require special weld preparation and machining after deposition of the pad.

Figure 3:
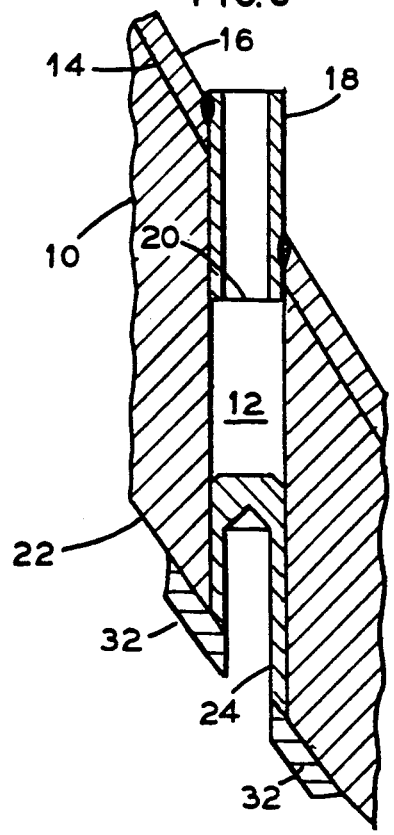
FIG. 3 is a sectional view of the plugging method of the present invention.

The plug and method of the present invention is illustrated in FIG. 3. Sleeve 18 is cut at point 20. The portion of sleeve 18 extending below exterior surface 22 is removed. Plug 24 is inserted into penetration 12 such that the end of plug 24 is flush with exterior surface 22. There is no need for machining of penetration 12 as in FIG. 2. Deposition of deposited weld pad 32 on exterior surface 22 and plug 24 is then performed. Weld pad 32 covers the edges of plug 24 and extends across a portion of exterior surface 22 to provide the necessary strength. The need to perform a separate attachment weld as in FIGS. 1 and 2 is eliminated since the plug attachment is accomplished during the step of depositing the weld pad. The elimination of the machining step eliminates the need for precise positioning of much more complicated tools and equipment under the pressurizer. The method is also beneficial when the thickness of wall 10 is insufficient for use of a partial penetration weld.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method for plugging a penetration in a pressure vessel wall having a sleeve protruding through said penetration, said method comprising the following steps:
   a. cutting said sleeve at a point between the interior and exterior surfaces of the pressure vessel wall;
   b. removing the cut portion of the sleeve extending beyond the exterior surface of the pressure vessel wall;
   c. inserting a plug into the penetration such that the end of the plug is flush with the exterior surface of the pressure vessel wall; and
   d. depositing a weld pad on the exterior surface of the pressure vessel wall and the plug.

2. A plug for plugging a penetration in a pressure vessel wall, comprising:
   a. a plug sized to fit within the penetration such that one end of the plug is flush with the exterior surface of the pressure vessel wall; and
   b. a weld deposited pad positioned on the exterior surface of the pressure vessel wall around the penetration and on the end of said plug that is flush with the exterior surface of the pressure vessel wall.

* * * * *